United States Patent [19]
Saumsiegle et al.

[11] 3,941,539
[45] Mar. 2, 1976

[54] INJECTION BLOW MOLDING APPARATUS AND METHOD

[75] Inventors: Robert W. Saumsiegle, Needham; Ieuan L. Harry, Billerica, both of Mass.

[73] Assignee: Continental Can Company, Inc., New York, N.Y.

[22] Filed: Dec. 5, 1972

[21] Appl. No.: 312,257

[52] U.S. Cl. .......... 425/242 B; 425/387 B; 425/441; 425/DIG. 205; 425/DIG. 211
[51] Int. Cl.². B29D 23/02; B29D 23/03; B29F 1/00
[58] Field of Search ......... 425/242 B, 387 B, 326 B, 425/324 B, DIG. 203, DIG. 205, DIG. 207, DIG. 209, DIG. 211, DIG. 213, DIG. 215, DIG. 216, DIG. 232, 441

[56] References Cited
UNITED STATES PATENTS

| | | | |
|---|---|---|---|
| 2,290,129 | 7/1942 | Moreland | 425/DIG. 208 |
| 2,331,687 | 10/1943 | Hobson | 425/DIG. 209 X |
| 2,901,769 | 9/1959 | Sherman et al. | 425/DIG. 211 |
| 3,183,552 | 5/1965 | Farkas | 425/DIG. 209 X |
| 3,264,684 | 8/1966 | Moslo | 425/DIG. 209 X |
| 3,408,691 | 11/1968 | Ruekberg | 425/DIG. 209 X |
| 3,616,491 | 11/1971 | Vollers | 425/DIG. 209 |
| 3,624,672 | 11/1971 | Splvy | 425/DIG. 205 |
| 3,776,991 | 12/1973 | Marcus | 425/324 B X |
| 3,816,580 | 6/1974 | Valyi | 425/DIG. 208 |

*Primary Examiner*—Francis S. Husar
*Assistant Examiner*—Carl Rowold
*Attorney, Agent, or Firm*—Diller, Brown, Ramik & Wight

[57] ABSTRACT

Injection blow molding equipment for the production of hollow articles wherein cores are axially inserted in blow molds and blank molds is disclosed. Compact core assemblies and fluid supply systems integral with the platens allow the mold parts to be mounted on the surfaces of opposed, relatively movable platens. Partible neck rings associated with each core open divergently outwardly as the blow mold and core separate, to shorten machine cycle time. A manifold, supplied with cooling fluid from the periphery of a core mounting plate, distributes heat transfer fluid to the core assemblies for cooling the neck rings. In one embodiment, mating blow mold sections are mounted on contra-oscillatable mounting members and are opened and closed by arcuate movement of the mounting members.

20 Claims, 14 Drawing Figures

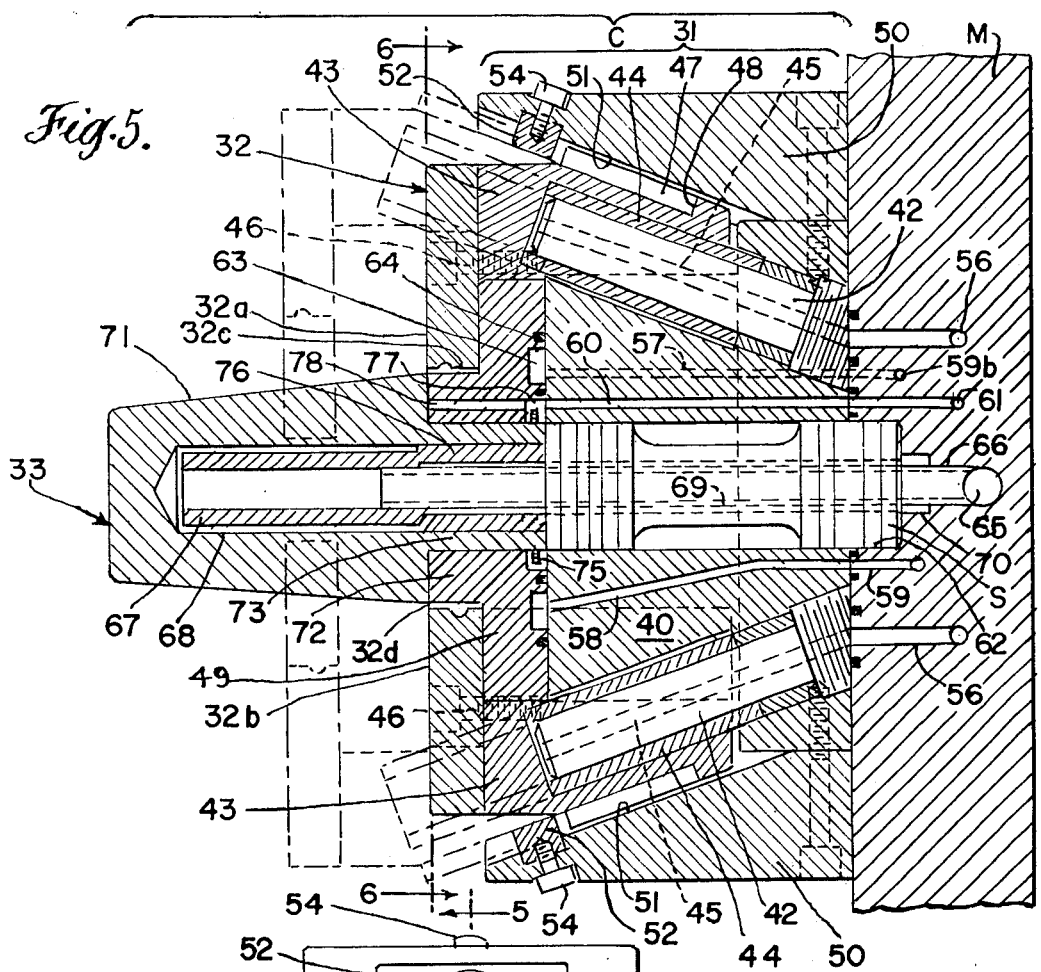

INJECTION BLOW MOLDING APPARATUS AND METHOD

BACKGROUND OF THE INVENTION

A. Field of the Invention

This invention relates to blow molding apparatus and methods for producing hollow containers from softened plastic materials and particularly relates to improved designs and methods of operation for injection blow molding machines.

B. Description of the Prior Art

Certain injection blow molding machine designs have been proposed wherein core assemblies having associated split neck molds are alternately inserted axially into preform injection molds and blow molds to form finished articles. In some of these designs, divergently opening blow mold parts are utilized so that upon separation of relatively movable platens, the blow mold parts open divergently outwardly, thereby allowing removal of the blown article from the blow mold on the retracting core - the partible neck ring sections being maintained closed about the neck of the blown article. When the platens are fully separated, the finished articles must be removed from the cores. In some of these designs, neck ring parts, which open divergently outwardly, are utilized and these neck ring parts must be opened to allow a stripper ring or other stripping means, for example, a blast of compressed air, to remove the finished article from the core. These designs are disadvantageous because of the requirement for complicated blow mold actuating structure and because of the need for additional elements such as stripper rings or an additional step in the machine cycle to accommodate the air blow off of the article. Other designs have contemplated a machine sequence wherein the blown article remains in the blow mold as the core is retracted. Thus, the closed blow mold acts to strip the finished article from the core. However, in such designs the use of partible neck rings which move only in a direction transverse to the axis of the core have been suggested. These latter mentioned designs are disadvantageous from the view point of machine control and operating speed as, before the core can be retracted, the neck rings must be completely opened to insure that no damage occurs to the neck of the article. In order for the neck rings to be opened, the clamping pressure of the press must first be relaxed to allow the neck rings to move. This results in an increase in machine cycle time and control complexity.

With respect to blow mold actuation, several designs have been proposed wherein common actuating elements have been utilized to open a plurality of blow molds. These designs use two corresponding mold halves, each including a plurality of mating mold cavities. In such designs, the blow molds must be arranged in a linear manner and thus are not adaptable to designs employing annularly alternating blow molds and injection molds. Also, as previously set forth above, it has been known to employ blow molds with divergently outwardly opening mold sections slideably mounted on inclined surfaces or supports. Such blow molds have been utilized with machines employing alternating blow mold and injection mold arrangements. However, commonly in these designs, the mold sections are mounted in cavities in one of the platens and are closed flush with the surface of the platen. This in turn requires the use of an injection press capable of developing very high clamping force to maintain adequate closing pressure between mold parts because the mating contact area between the platens is great, constituting substantially the entire face of each platen. This is disadvantageous for reasons mentioned below and, in addition, this type of blow mold structure is expensive and complicates the problems of heat transfer from the mold.

In previous designs employing rotatable or oscillatable core carrying elements, the supply of various fluids, such as high pressure air and heat transfer mediums, has been accomplished by the use of flexible hoses. A multiplicity of hoses are required to supply the fluids from a stationary distribution point to a plurality of points of use on the rotating core carrying element. This system of supply gives rise to problems of fluid leakage as leaks are prone to occur in the hose couplings and hoses as a result of constant flexing.

Previously, it has been known to mount core assemblies on relatively movable platens of injection molding presses so that the neck ring operating structure and base of the core are received in a cavity in one of the platens. This has in part, been necessary because core assemblies with attendant neck ring actuating structure are large, thereby precluding the mounting of these assemblies on the surface of platens because of the restricted daylight opening between the injection press platens. Thus, the core mounting structure and neck ring actuating structure are recessed below the clamping surface of the platen and access to these parts can be accomplished only by removing the entire core assembly. This unnecessarily complicates maintenance procedures and increases the amount of time necessary to accomplish the change-over of mold parts when a change in container shape is desired. Also, in these designs the neck rings close flush with the face of the platen. This increases the mating surface area between platens. It should be realized that in order to prevent leakage of the injected plastic material between mating portions of the cores and injection cavities, it is necessary to seal such portions at a pressure greater than the pressure of the injected plastic material. Therefore, the greater the surface area of such mating portions, the higher the clamping force of the press platen must be. Thus, machines utilizing such designs require injection presses capable of developing excessively high clamping forces. This is so because the pressure necessary to maintain a seal between the mating portions of the cores and injection cavities to overcome the pressure of the injected plastic material must be generated over substantially the entire face area of the mating platens.

C. Summary of the Invention

It is an object of this invention to reduce the operating cycle time of blow molding machinery by the use of improved neck ring and blow mold structure.

It is an object of this invention to provide blow molding apparatus wherein the area of abutting surfaces of mating parts is minimized.

It is another object of this invention to utilize an operating sequence of mold parts which takes maximum advantage of the basic operating cycle of an injection molding press to reduce machine cycle time.

It is an object of the invention to provide core assemblies of which the mounting portion is of reduced dimension in a direction lengthwise of the core to allow mounting of the core assembly to an exterior surface of a platen without the need for increasing the daylight opening between relatively movable platens of an injection press.

It is another object of this invention to provide improved blow mold actuating structure for opening and closing blow molds.

It is an additional object of this invention to provide blow molding machinery having improved fluid supply systems.

It is a further object of this invention to provide blow molding apparatus including provisions for increased accessibility of mold parts.

It is also an object of this invention to provide blow mold apparatus wherein required platen clamp tonnages are reduced.

Briefly, these and other objects of the invention are achieved by utilizing divergently outwardly opening neck rings which move away from the neck of the formed article simultaneously with the withdrawal of the core from the article. The finished article remains in the closed blow mold, thereby allowing an overlap in the core removal and cooling segments of the machine operating cycle and allowing a shorter total machine operating cycle. The blow mold sections are opened simultaneously by a common actuating structure which moves the mold segments arcuately toward and away from each other. Core assemblies utilizing fluid motors formed integrally with parts of the core assembly are of reduced length and allow mounting of the core assemblies on surfaces of a core carrying element. Fluid supply systems have formed integrally in the core carrying element supply required fluids to the core assemblies.

D. Brief Description of the Drawings

FIGS. 1 through 4 form a sequential diagrammatic illustration of the machine operating cycle of one type of injection blow molding machine using mold parts in accordance with the present invention.

FIG. 5 is a sectional illustration of one form of core assembly which may be used in the equipment diagrammed in FIGS. 1 to 4 or alternately in other equipment as will appear.

FIG. 6 is a face view of the core assembly illustrated in FIG. 5, taken along line 6—6 of FIG. 5.

E. Description of Illustrated Embodiments

Figure 1:
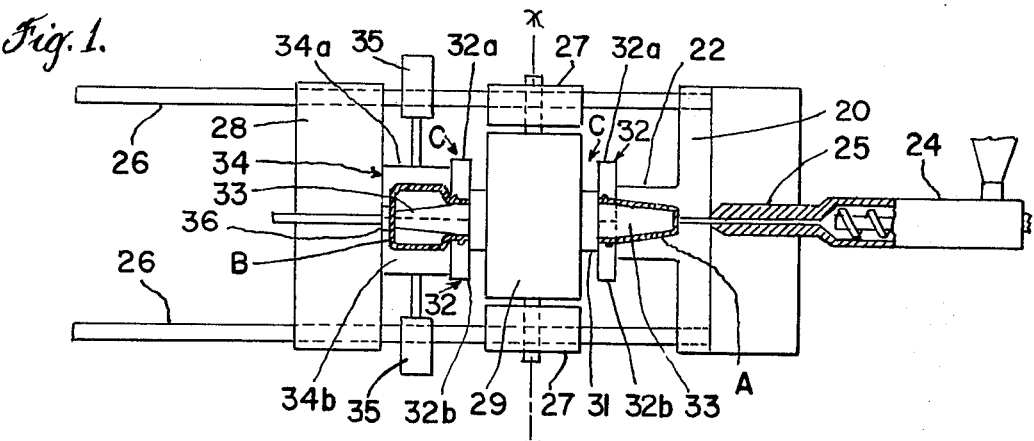

There is shown in FIG. 1 a generalized view of injection blow molding machinery of the type disclosed in U.S. Pat. Nos. 3,339,231 and 3,412,186, the disclosures of which are hereby incorporated by reference. Briefly, this apparatus is comprised of a fixed platen 20 on which is mounted a plurality of injection molds 22. Softened resinous plastic in a flowable state is supplied to the injection molds 22 by a suitable hot runner system (not shown) contained in the fixed platen 20. The softened material is supplied to the hot runner system by a feed system such as a screw-type feeder 24 which supplies plastic material to a nozzle 25.

Extending from the fixed platen 20 are parallel tie bars 26 on which are slidably mounted intermediate platen 27, and a movable platen 28. The intermediate platen 27 carries a carriage 29, that is mounted for oscillation about an axis transverse to the direction of movement of the intermediate platen 27 on tie bars 26. Core assemblies C are mounted in aligned and opposed relationship on opposite sides of carriage 29. The core assemblies include a mounting base 31, neck ring parts 32 and a preform core element 33. The core assemblies C also include mounting and actuating structure for the neck ring parts 32 which shall be hereinafter described with respect to FIGS. 5-8. Although, in the interests of simplicity, the equipment herein schematically illustrated shows only one core assembly mounted on each side of the carriage 29, it should be realized that in commercial form, a plurality of core assemblies are mounted on the carriage 29.

The blow molds 34 are each comprised of blow mold halves 34a and 34b and the blow molds are mounted on movable platen 28. In the diagrammatic illustrations of FIGS. 1-4, suitable actuators such as hydraulic motors 35 urge the blow mold parts 34a and 34b toward and away from each other to open and close the blow molds.

Means are provided in the apparatus shown in FIG. 1 for causing the intermediate platen 27 and movable platen 28 to be moved along the tie bars 26. Also, actuating structure is provided to cause carriage 29 to be oscillated in an arc of 180°. Suitable structure for accomplishing these functions is illustrated and described in the aforementioned U.S. Pat. Nos. 3,339,231 and 3,412,186.

Briefly, regarding the operation of the apparatus illustrated in FIGS. 1-4, when the platens 27 and 28 are closed, i.e., positioned as shown in FIG. 1, opposed core elements 33 are received in injection mold 22 and blow mold 34. A preform A is formed on the core element and in the mold cavity of the associated neck rings 32 by the injection of plastic material into the injection mold 22. Simultaneously, a preform previously formed on the opposed core element 33 is blown into shape of the finished article B in the blow mold 34. After the preform A and finished article B are so formed, the platens 27 and 28 are separated from fixed platen 20 and the carriage 29 is rotated 180°, thereby transferring preform A for insertion in a blow mold 34 and a free core 33 for insertion in injection mold 22. The movable platens 27 and 28 are thereafter closed, i.e., moved to the right toward fixed platen 20 as shown in FIG. 1, and the above recited forming steps are repeated. A detailed description of machine operating cycle appears below.

A vacuum hold down and ejector device 36 is mounted in the bottom of blow mold 34 for purposes to be hereinafter described.

Referring to FIGS. 5 and 6, there is shown one form of core assembly C. The core assembly is comprised of a mounting section 31, a pair of neck ring parts 32a and 32b and a core element 33. The mounting section 31 includes a core mounting block 40 on which is mounted the core element 33. A pair of pins 42 are fixed on the core mounting block 40 and extend angularly outwardly with respect to the center line of core element 33.

The neck ring parts 32a and 32b are mounted for divergently outward and convergently inward movement with respect to core element 33 by means of neck ring mounting blocks 43 which are slidably mounted, as by means of cylindrical bushings 44, on the pins 42. The bushing 44 forms a fluid-tight seal with the exterior surfaces of the pin 42. For reasons as will hereinafter be described, each pin 42 includes a longitudinal bore 45 extending the length of pin 42. Each neck ring part 32a and 32b is secured to a neck ring mounting block 43 by suitable fastening elements such as machine screws 46. The mounting blocks 43 include a groove or channel 47 which terminates in an end wall 48. Heel blocks 50 are secured to mounting base 40 adjacent the mounting blocks 43. Heel blocks 50 include an inclined surface 51 and a stop element 52 fixed on the heel block 50, for instance, by a threaded fastener 54. The stop element 52 is positioned to be engaged by the end wall 48 of channel 47 formed in the neck ring mounting blocks 43, as will hereinafter be described.

When the split neck ring parts 32a and 32b are in place adjacent the base of core element 33, a neck mold cavity 32d is formed between internal surfaces 32c of the neck rings and the corresponding portion of the core element 33. When the core element 33 is inserted in an injection mold cavity, the neck ring parts 32a and 32b are in abutment with the top surfaces of the injection mold as shown in FIGS. 1 through 4, and the neck mold cavity 32d forms a continuation of the preform mold cavity formed between core element 33 and the injection cavity of the injection mold. When plastic material is fed under pressure into the injection cavity, such material also enters the neck mold cavity 32d and forms therein the neck of the article being molded. When the neck of the article is formed with an irregular outer surface, as for instance, with a thread, it is necessary to separate the neck mold parts 32a, 32b from the neck of the formed article to enable axial retraction of the core element 33 from the article without damage to the neck of the article.

Figure 9:
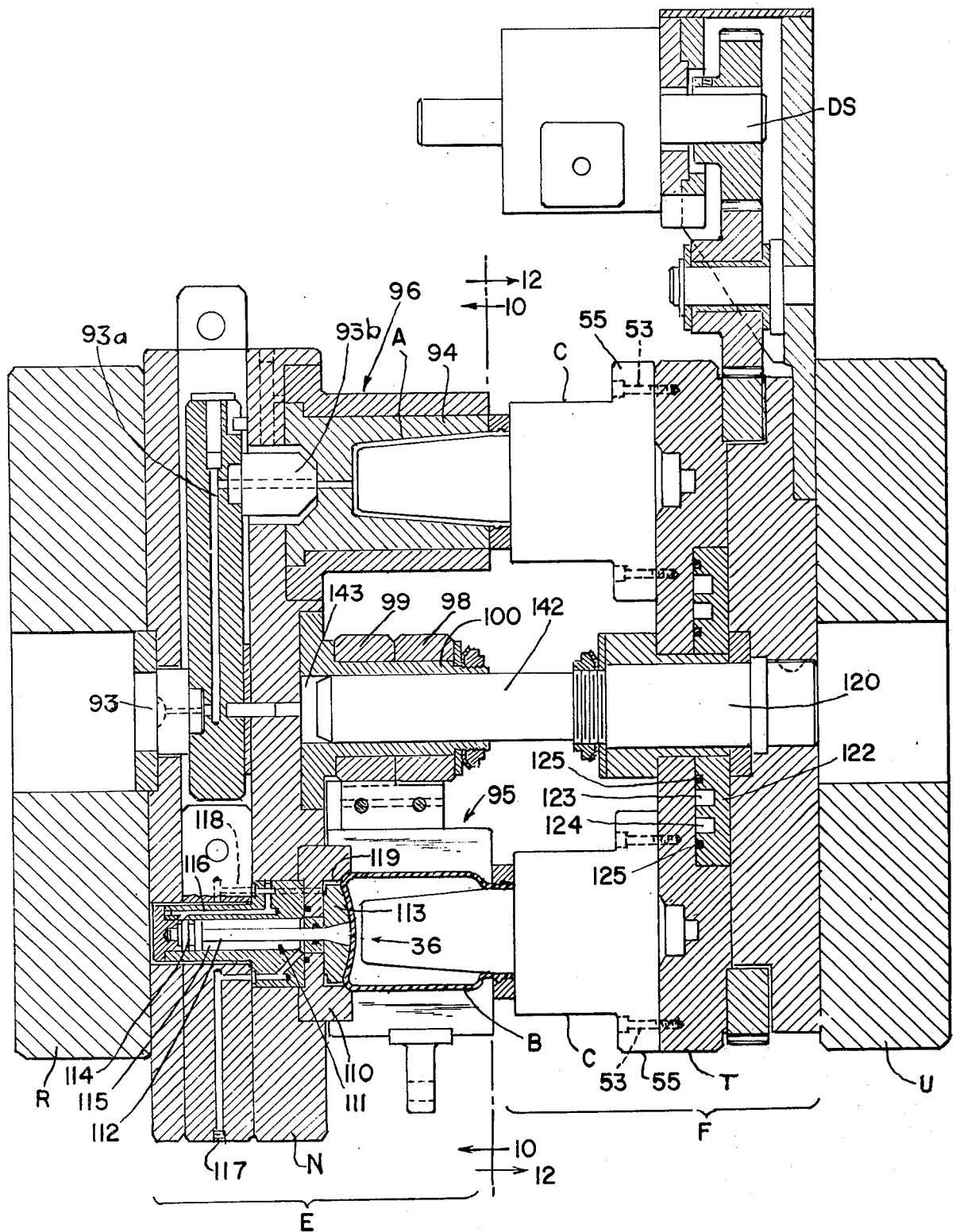
FIG. 9 is a sectional side elevation of a second type of injection blow molding apparatus employing an oscillatable turntable and having mold parts in accordance with the present invention, the right hand portion of the view being taken along line 9—9 of FIG. 12 and the left hand portion being taken along line 9—9 of FIG. 10.

The core assembly C is mounted to a mounting member M, (FIG. 5), for instance, the carriage 29 of the apparatus illustrated in FIG. 1 or turntable T of the apparatus illustrated in FIG. 9, by means of fasteners 53 passing through the flange of the core mounting block 40. The core assembly C is mounted to the plate M so that the longitudinal channels 45 in pins 42 are in fluid tight registry with conduits 56 formed in mounting plate M. Also, conduits 57 and 58 formed in mounting block 40 are in registry with conduits 59 and 59b respectively formed in mounting plate M. Further, air supply conduit 60 formed in mounting block 40 is in registry with air supply conduit 61 formed in mounting plate M. Suitable seals, such as flexible O-rings, are disposed in the mounting plate M and form a fluid tight seal at the interface between the various aligned conduits. Also, stem S of the core element 33 is received in a suitable aperture 62 in the mounting member M and a central tube 66 in the stem S communicates with internal passage 65 formed in plate M for purposes of supplying a heat transfer medium to the core element 33 as will hereinafter be described.

As the bushing 44 forms a fluid tight seal with the pin 42, the introduction of pressurized fluid through channel 45 into the space between the top of pin 42 and mounting block 93 will cause the mounting block and bushing to be moved relative to pin 42. Because of the angular mounting of the pins 42, the neck ring mounting blocks 43 move upwardly and outwardly with respect to the core element 33. Outward travel of the neck ring parts 32a and 32b is determined by the position of stop element 52 with respect to the surface 48 carried by the neck ring mounting block. When the surface 48 is positioned against the stop element 52, the neck ring parts will be at the maximum extent of travel as shown in the phantom lines of FIG. 5.

With reference to FIGS. 1 through 4, the operating cycle of one type of injection blow molding machine utilizing core assemblies as herein disclosed is described. As previously stated, FIG. 1 depicts a point in the operating cycle of the apparatus as disclosed in U.S. Pat. No. 3,339,231. At the point shown, the movable platens 27 and 28 are closed and a preform A and a formed article B are simultaneously formed in the injection mold 22 and blow mold 34, respectively. At the injection station 22, the neck mold parts 32a and 32b are closed about the base of core element 33 thereby defining a molding chamber for the formation of the neck of an article.

Figure 2:
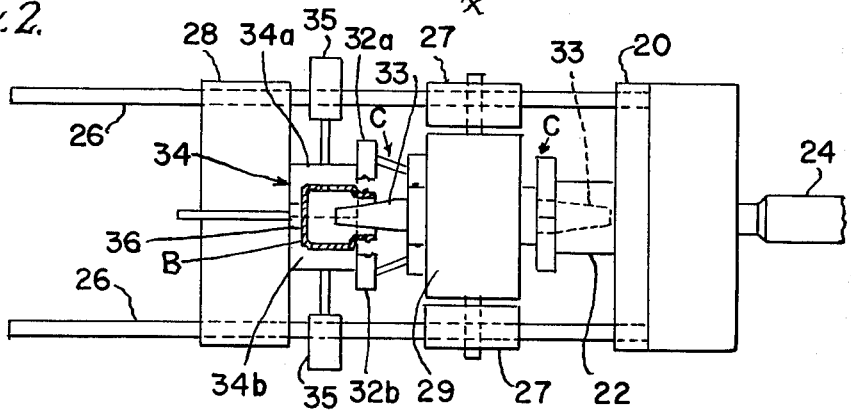

When the walls of the finished element B have been blown into contact with the interior molding surfaces of the blow mold 34, the platen 28 is moved away from the platen 27. Just prior to the separation of the platen 28, the actuating structure for the neck mold parts 32a and 32b is supplied with fluid under pressure. When the platen 28 moves away from the platen 27, the neck mold parts 32a and 32b are moved outwardly by the previously described actuating structure and remain in engagement with the faces of the blow mold parts 34a and 34b, as shown in FIG. 2. As the neck mold parts 32a and 32b move in the direction of travel of the platen 28, the mold parts, by reason of the mounting structure heretofore described, slides outwardly across the face of the blow mold parts 34a and 34b, thereby moving away from engagement with the neck of the article B. It should be realized that the neck ring parts 32a and 32b can begin opening immediately upon the beginning of movement of platen 28 as the clamping pressure between the faces of the blow mold parts 34a and 34b and the neck ring parts 34a and 34b will have been terminated.

Figure 3:
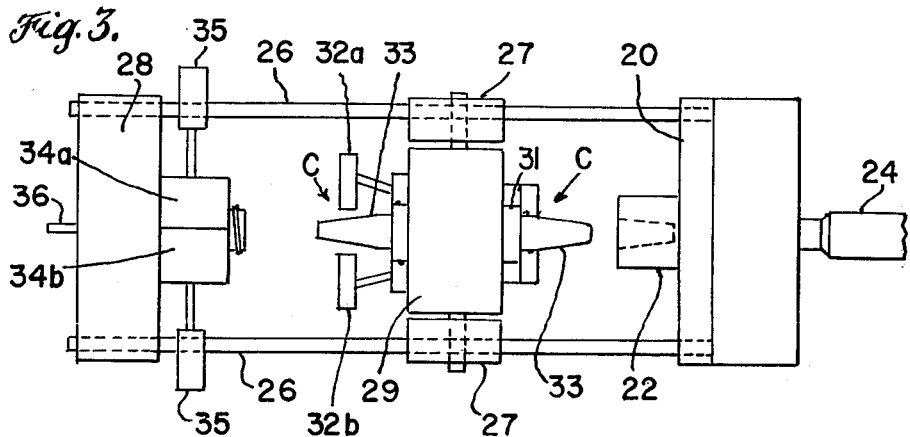
Figure 4:
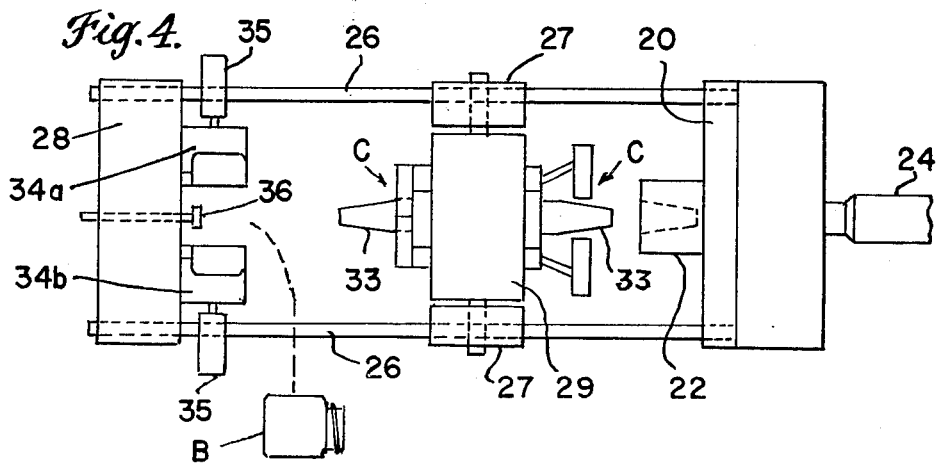

Referring to FIG. 3, as the platen 28 continues to move, the neck ring parts 32a and 32b will eventually reach a limit of travel as heretofore described and platen 28 will continue to move away from platen 27. Also, the platen 27 will begin to move away from the fixed platen 20 to retract a core element 33 from an injection mold 22. At or near the time the platen 28 reaches its open position, the blow mold parts 34a and 34b will begin to separate. The finished article B will be held at its bottom surface by the vacuum hold down and ejector device mentioned above and hereinafter described in more detail with respect to the blow mold illustrated in FIG. 8. Once the blow mold halves have been fully retracted, the vacuum holding the article B is terminated and the ejector is actuated to propel the finished article from the opened blow mold. The carriage 29 is then turned through 180° and the platens 27 and 28 are again closed to the position shown in FIG. 1. Closure of the neck ring parts 32 a and 32b of the core entering the injection cavity 22 is accomplished by the front face of the injection mold as the platen 27 moves toward fixed platen 20.

Referring again to FIG. 5, cooling of the neck ring parts 32a and 32b can be accomplished in the following manner. The underside of the core element 33 is provided with an annular channel 63 which, with suitable seals such as O-rings 64 forms, with the top of core mounting block 40, a fluid tight channel. Cold water or other suitable cooling medium is introduced from conduit 59 in the mounting plate M to the channel 63 via a water inlet channel 58. A second channel 57 similar to inlet channel 58 serves as an outlet channel in a manner as previously described in connection with conduit 58. Cold water supplied by conduit 58 circulates through channel 63 and cools the lower portion of core element 33. In retracted position, the neck ring mold parts 32a and 32b are positioned against the top side of the flange 49 of the core element 33 and heat is drawn from these neck mold parts by conduction through the flange 49 and base of core element.

Core element 33 also includes a second heat transfer circulation system including a tube 66 which communicates with a source of heat transfer fluid 55 in the mounting plate M. Fluid from the source 65 is carried up through the center of the stem S by the tube 66 to the barrel 67. Heat transfer fluid fountains from the barrel 67 beneath the top of the core element 33 then travels, via the annular space 68 between the barrel space 67 and the core element 33 to a plurality of conduits 69 formed in the stem S. The fluid from the conduit 69 empties into a collection chamber 70 from which the heat transfer fluid is collected and conveyed elsewhere in the plate M.

Blowing air is supplied to core element 33 by a suitable supply conduit 61 disposed in the mounting plate M which communicates with a conduit 60 disposed in the core mounting block 40. In order to introduce blowing air to the interior of a preform, the core element 33 is comprised of a movable tip section 71 and a base section 72. The tip section 71 includes an annular mounting section 73 slidably received on the reduced diameter shoulder 76. Thus, the tip section 71 is mounted for movement relative to base section 72. Such movement is limited, however, to a total distance of about several thousandths of an inch by a stop member, such as a snap ring 75 disposed on the inner portion of the mounting section 73. When air is introduced through conduit 60, it is received in a chamber 77 in the mounting section 72. A conduit 78 formed in the mounting portion 72 and communicating with the chamber 77 carries the air to the outer surface of the mounting section 72, whereupon the tip section 71 of the core element 33 is urged outwardly thereby forming an annular blowing orifice between the bottom edge of the tip section 71 and the mounting section 72.

Figure 7:
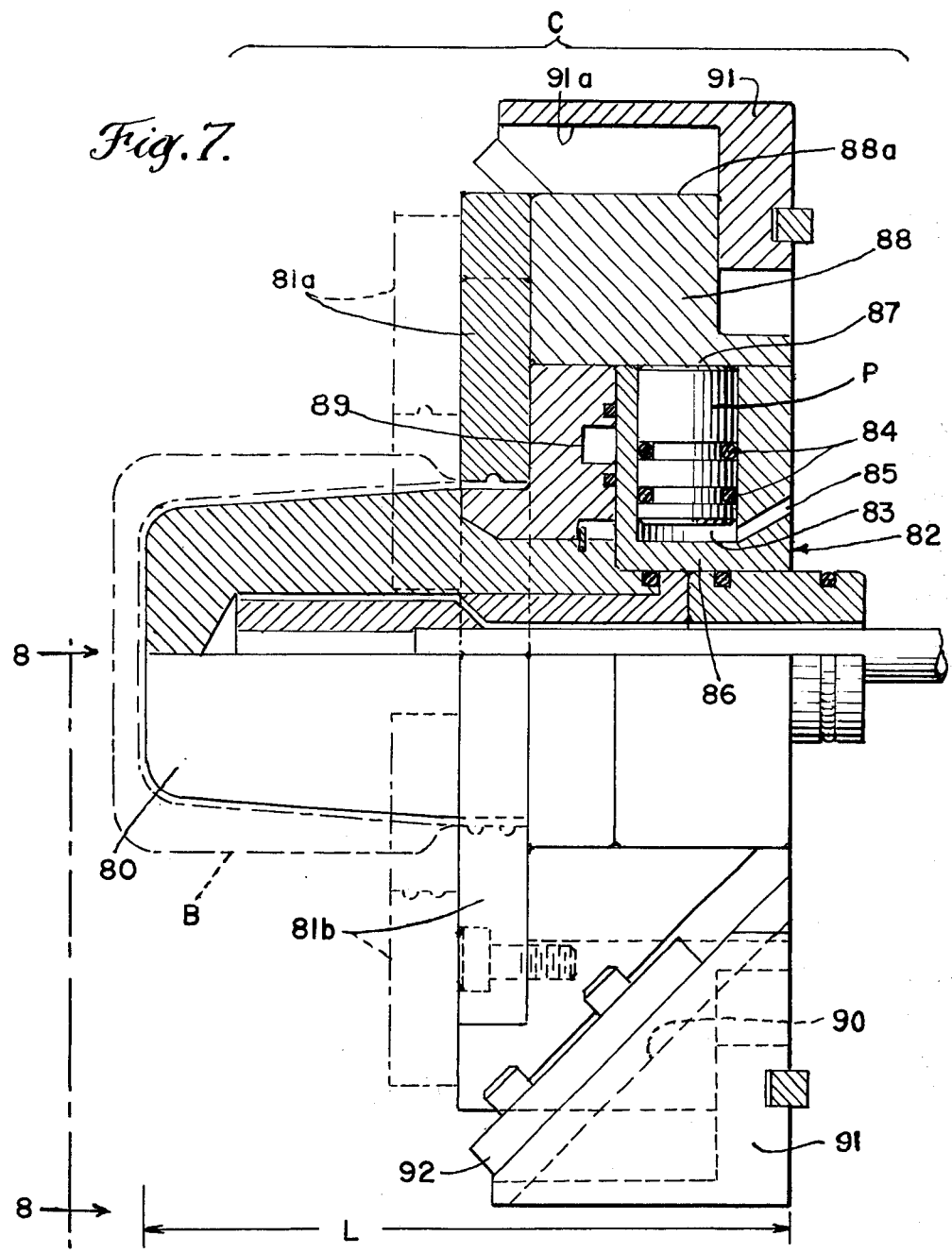
FIG. 7 is a partial sectional view of a second form of core assembly, which may be used in the equipment diagrammed in FIGS. 1 to 4 or alternately in other equipment as will appear.
Figure 8:
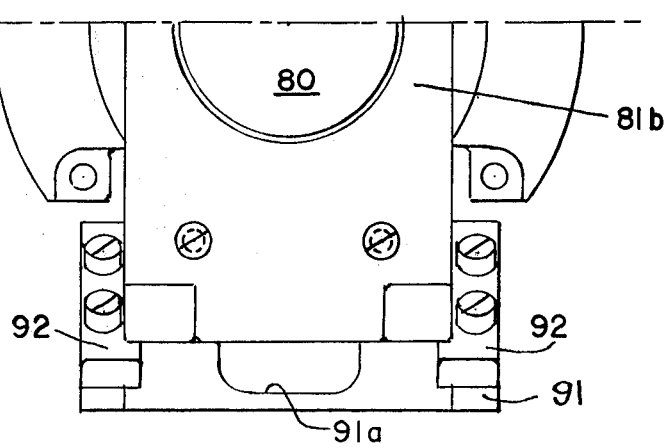
FIG. 8 is a face view of the lower half of core assembly shown in FIG. 7, taken along line 8—8 of FIG. 7.

In FIGS. 7 and 8 there is shown a second embodiment of a core asembly including a core element 80 and neck ring parts 81a and 81b. The overall length L of the core assembly 80 is minimized by the use of a neck mold actuating arrangement wherein the primary direction of travel of motors separating the neck rings is normal to the longitudinal axis of the core element 80. As shown in FIG. 7, the core element 80 is mounted to a core mounting block 82 that includes a plurality of chambers or cores 83. Disposed in the cores 83 is motor means in the form of a fluid motor with a piston element P having suitable sealing elements such as O-rings 84 engaging the surface of the chamber 83. In the embodiment disclosed, the direction of travel of the piston P is normal to the longitudinal axis of the core element 80, but it should be realized that the piston could be canted but still have a direction of travel wherein the major component of movement is in a direction perpendicular to the longitudinal axis of core element 80. Designs having the pistons P canted at angles of up to 45° have yielded desired results in terms of operation and compactness, as later described in connection with FIGS. 13 and 14.

The piston P is moved outwardly of the chamber 83 by the introduction of fluid under pressure through a conduit 85 into the space between the back wall 86 of the chamber 83 and the piston P. The face 87 of the piston P slideably engages mounting block 88 to which neck mold sections such as sections 81a and 81b are mounted. The neck ring mounting blocks 88, when urged outwardly by the piston P, move upwardly on inclined surface 90 disposed on heel blocks 91.

Guides 92 are fixed to the heel block 91 to guide the mounting blocks 88 laterally as they slide on inclined surface 90 of the heel blocks 91. Thus, when the piston P moves outwardly, the mounting blocks 88 are caused to move outwardly and upwardly along the inclined surfaces 90, causing the neck ring sections, such as section 81a, to be moved divergently outwardly from the core element 80 (as shown by the dotted lines in FIG. 7), thereby becoming free from the neck of the article B disposed on the core. The extent of travel of the neck rings is limited by a projection 88a on the mounting block 88 which abuts the surface 91a of the heel block 9 when the neck rings have been opened the desired distance.

Figure 13:
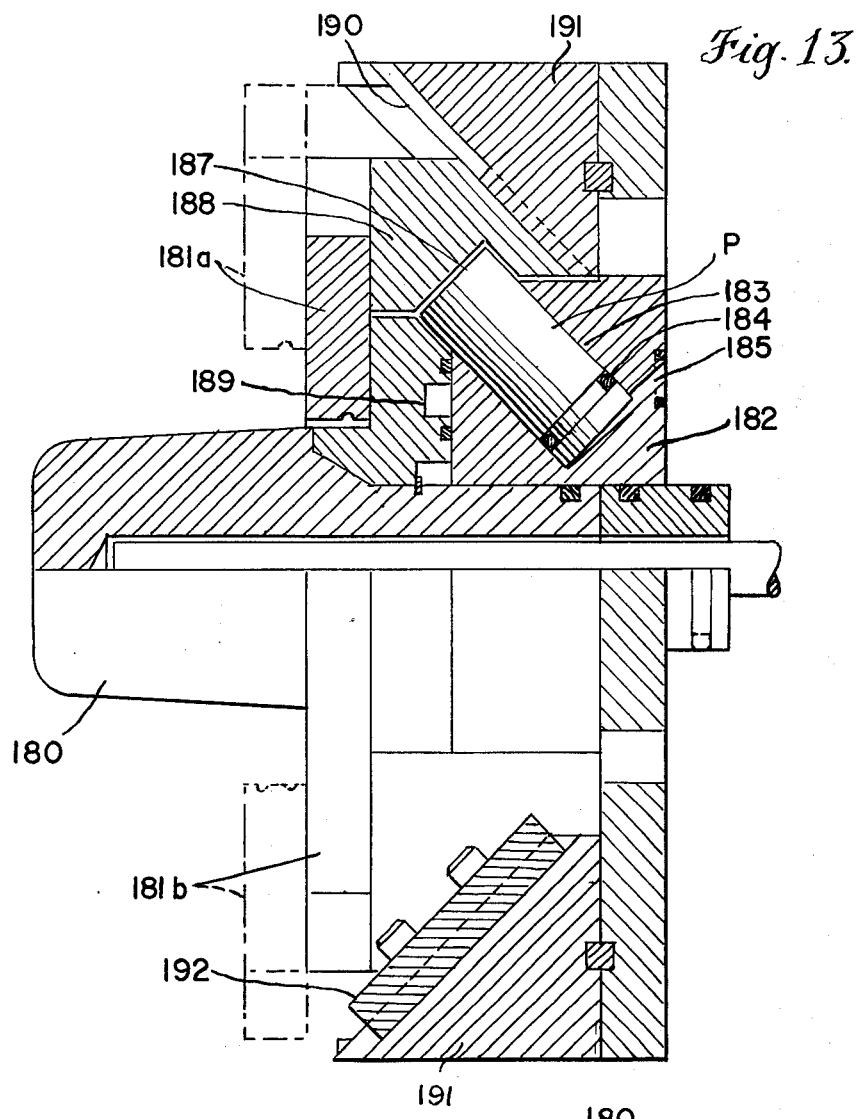
FIG. 13 is a partial sectional view of a third form of core assembly, which may be used in the equipment diagrammed in FIGS. 1 to 4 or the equipment illustrated in FIGS. 9 to 12.
Figure 14:
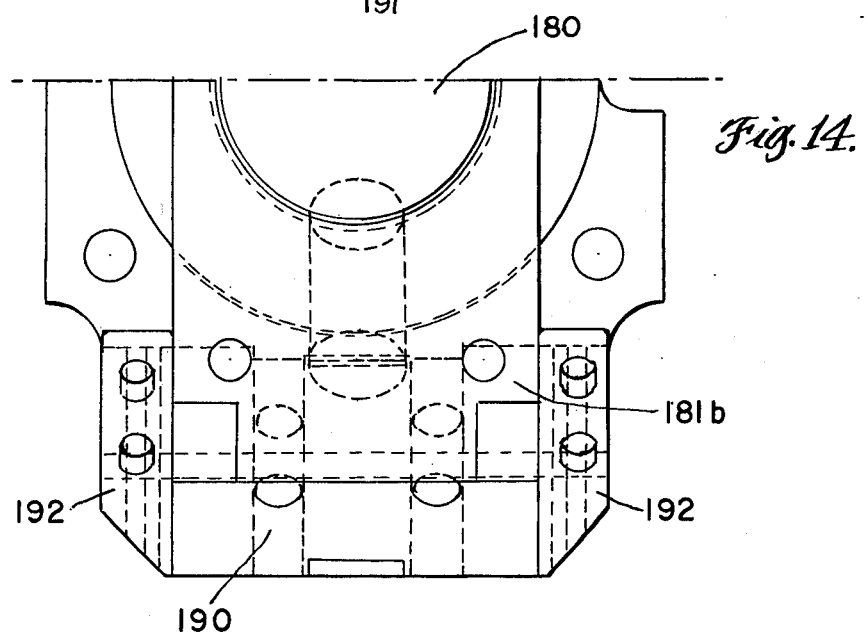
FIG. 14 is a face view of the lower half of the core assembly shown in FIG. 13, taken along line 14—14 of FIG. 13.

In FIG. 13 there is shown a core assembly similar to core assembly C previously discussed in connection with FIGS. 7 and 8. In the embodiment shown in FIG. 13, a core element 180 is mounted on a core mounting block 182. The core mounting block has formed therein at least two chambers, such as chamber 183 in each of which is disposed a piston P having sealing means 184. Each chamber 183 communicates with a source of fluid under pressure through a conduit 185 formed in the core mounting block 182. It should be noted that the longitudinal axis of piston P is disposed at less than a 90° angle with respect to the longitudinal axis of the core element 180. In the preferred embodiment, the foregoing angle is about 45°.

Positioned outwardly of the core mounting block 182 are two heel blocks 191, each having formed thereon an inclined surface 190. A neck mold section mounting block 188 is slideably disposed on each surface 190 and has mounted thereon one of the neck mold sections 181a and 181b. The introduction of fluid under pressure through conduit 185 into chamber 183 causes the outward movement of the piston P which in turn moves neck mold section mounting blocks 188 on the inclined surfaces 190, thereby causing the neck mold sections 181a and 181b to move away from the neck of an article formed on the core element 180, as shown in the dotted line positions of FIG. 13. Lateral movement of neck mold section mounting blocks 188 is precluded by a pair of guide members 192 positioned on each side of the neck mold section mounting blocks.

Because of the angular inclination of pistons P in the embodiment shown in FIG. 13, the lateral extent of the core assembly (the distance between the outside edges of top and bottom heel blocks 191 as illustrated in FIG. 13) can be reduced in comparison to the embodiments illustrated in FIG. 7 and 8. This allows the mounting of a greater number of such core assemblies on apparatus as heretofore described in FIG. 1 and as hereinafter described in FIGS. 9 through 12.

The supplying of coolant to the neck rings, of heat transfer fluid to the core element, and of blowing air to the core assemblies shown in FIGS. 7 and 13 is accomplished in generally the same manner as that heretofore described in connection with the core assembly shown in FIGS. 5 and 6. Coolant is supplied via inlet conduits (not shown) to annular channels 89 (FIG. 7) and 189 (FIG. 13), formed on the bottom surface of core elements 80 and 180 respectively. Suitable output channels (not shown) are provided to withdraw coolant from the channels 89 and 189. The coolant flows through the channels 89 and 189 and draws heat from the base of the core elements 80 and 180. Because the base of the core element is cooled, heat is drawn from the neck ring sections 81a and 81b (FIG. 7) and 181a and 181b (FIG. 13) by conduction when the neck ring sections are closed about the base of the core element. Thus, the plastic material which flows into the cavity formed between the core element and the neck ring sections is quickly solidified prior to the blowing step, thereby ensuring a good neck finish on the formed article.

In FIG. 9 there is shown another form of injection blow molding apparatus. This type of apparatus is comprised of two sections E and F. The section E includes an annular array of preform injection molds and blow molds mounted in an alternating series. As shown in FIG. 9, the section E is mounted to the fixed platen R of an injection press. The section F includes a plurality of core assemblies of the type previously illustrated in FIGS. 5 – 8, mounted on an oscillatable turntable T. The turntable T is mounted for oscillation on the movable platen U of the injection press.

In the apparatus shown in FIGS. 9 through 12, the movable platen U is moved toward the fixed platen R to position the mold cores in the blow molds in injection molds of the alternating mold arrangement mounted on the fixed platen R. While the platens are closed, preforms are formed on cores disposed in the injection molds and finished articles are formed in the blow molds. When this segment of the cycle is complete, the movable platen U is moved to retract the cores from the molds and the turntable is oscillated by a suitable drive system, for instance, the hydraulic rack and gear drive system DS shown in FIG. 9, to position the cores in alignment with alternate injection molds and blow molds. The movable platen U is then moved toward the platen R and the cores are re-inserted in the injection molds and blow molds.

Plastic material is caused to flow from the injection sprue 93 through a suitable hot runner system 93a to a delivery nozzle 93b from whence it is injected into the injection mold, thereby forming a preform A.

Figure 10:
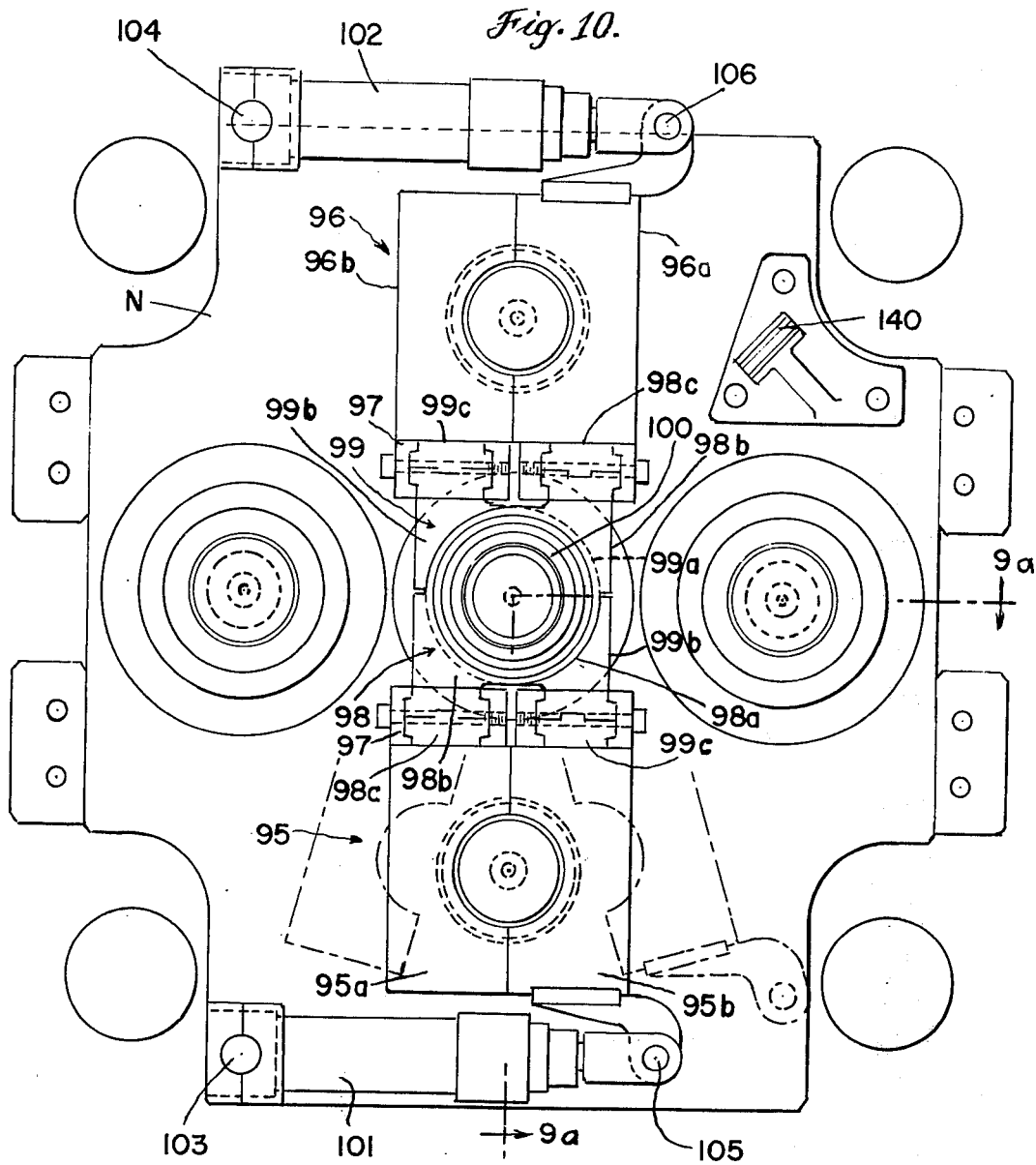
FIG. 10 is a frontal elevation of the molding apparatus shown in FIG. 9 taken along line 10—10 of FIG. 9.
Figure 11:
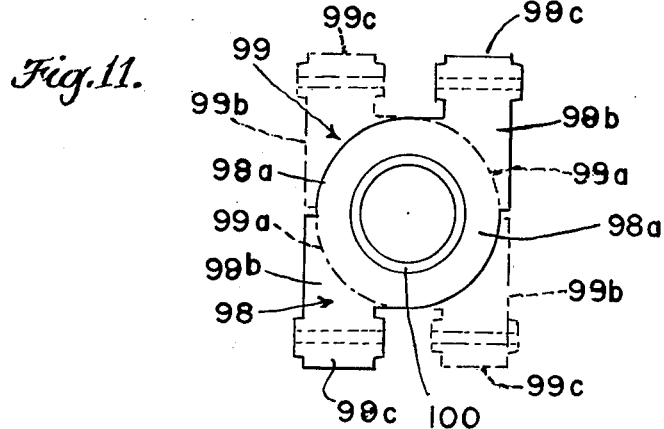
FIG. 11 is a detailed view of mold mounting rings utilized in the apparatus shown in FIG. 9 taken along line 12—12 of FIG. 9.

In the apparatus illustrated in FIGS. 9-12 the blow molds 95 and 96 are comprised of partible sections 95a and 95b and 96a and 96b respectively which are mounted for arcuate movement, as will herein later be described, so that the blow molds 95 and 96 are alternately opened and closed. Rotatable mounting elements such as mounting rings 98 and 99 are rotatably mounted on hollow center post 100 secured to mounting plate N. As shown in FIG. 11, the mounting rings 98 and 99 can include a generally annular body section such as 98a and 99a from which projects a plurality of arms 98b and 99b. It should be realized that the number of arms projecting from the body is determined by the number of blow molds contained in the annular array and that such arms will be equiangularly spaced with respect to each other. Each of the arms 98b and 99b includes a mounting lug 98c and 99c disposed at its outer end. Corresponding blow mold parts such as 95a and 96a and 96b are secured to the mounting lugs 98c and 99c respectively.

Actuating structure is provided to cause mounting rings 98 and 99 to be rotated in opposite directions to each other on the post 100. One such actuating structure is illustrated in FIG. 10 and includes two hydraulic jacks 101 and 102 mounted by trunnions 103 and 104 respectively to the mounting plate N. The drive rods of each hydraulic jacks 101, 102 are secured by suitable means, such as by a clevis 105 and 106 respectively to blow mold sections 95b and 96a respectively. When the jack 101 is actuated, the blow mold section 95b is urged toward the right as viewed in FIG. 10, to the dotted line position there shown. It will be recalled that the blow mold section 95b is rotatably mounted to the post 100 by reason of mounting ring 99 and therefore, the movement of blow mold half 95b is arcuate and in a counterclockwise direction. As the mounting 99 is moved by reason of movement of blow mold half 95b, all arms 99b on the mounting ring 99 will be subject to the same arcuate movement as blow mold section 95b. Therefore, all blow mold sections affixed to the mounting ring 99 will be moved an equal arcuate distance. In a like fashion, blow mold section 96a is moved in a clockwise direction by the hydraulic jack 102 thereby rotating mounting ring 98 and causing equal arcuate movement of all blow mold sections affixed to the mounting ring 98. Thus, joint actuation of hydraulic jacks 101 and 102 causes each of the blow molds, such as molds 95 and 96 to be opened by arcuate movement of the respective blow mold halves in opposite directions as shown in the phantom view of blow mold 95 in FIG. 10. Similarly, actuation of hydraulic jacks 101 and 102 in directions opposite to that previously described causes arcuate movement of the blow mold sections to the full line positions shown in FIG. 10, thereby closing the blow molds.

As shown in FIG. 9, the blow molds also include a combined vacuum hold down and ejector assembly 36 including a base plate 110 mounted on the mounting plate N and an ejector 111 including a stem 112 and a head 113. Affixed to the stem 112 at the end opposite the head 113 is a suitable seal 114 slidable in and in fluid tight engagement with chamber 115. Conduit 116 supplies air under pressure to chamber 115 to move the ejector 111 outwardly. Conduit 117 constitutes an exhaust or vacuum line for the escape of air from cylinder 115. Conduit 118 communicates with a vacuum source and with an annular channel 119 formed between the head 113 of the ejector 111 and the base plate 110.

While the ejector-hold down assembly 36 is illustrated in connection with the blow molds depicted in the apparatus of FIGS. 9–12, it should be realized that such units can be used with all types of partible blow molds including those which part linearly as illustrated in the apparatus of FIGS. 1–4.

The ejector-hold down asemblies 36 operate in the following manner. When the preform A is blown into the shape of a finished container B against the walls of a blow mold and is cooled sufficiently so that the walls have sufficient rigidity to be self-sustaining, the blow mold halves are parted to allow removal of the finished article from the mold. Just prior to parting, a source of vacuum is supplied to the conduit 118 which in turn induces a vacuum in the channel 119, thereby holding the finished article B, by its bottom, against the base plate 110 and head 113. As the blow mold sections part, the finished article B is retained centered on the base plate 110 and is freed from the surfaces of the blow mold cavity as the blow mold sections move away from the finished article B. When the blow mold halves are opened to the maximum extent, high pressure air is supplied via conduit 116 to move the plunger 36 outwardly of the chamber 115 thereby causing the finished article B to be ejected from the blow mold. The extent of movement of plunger 111 is in part dictated by the positioning of the parting lines of the blow molds. If all the blow molds part along a vertical parting line, as illustrated in the aforementioned U.S. Pat. Nos. 3,339,231 and 3,412,186, then the finished articles B can fall, under the influence of gravity, from the parted mold halves. In this instance, the plunger 111 is required to move only a short distance, on the order of ¼ of an inch, to dislodge the finished article B from the mounting base 110. If the parting lines of the blow molds are other than vertical or if parts of the blow mold equipment are disposed so as to prevent the free fall of the finished article from the opened blow molds, (as in the FIG. 9 embodiment) then the ejector 111 must move a greater distance and must propel the finished article beyond the longitudinal extent of the blow mold sections.

Figure 12:
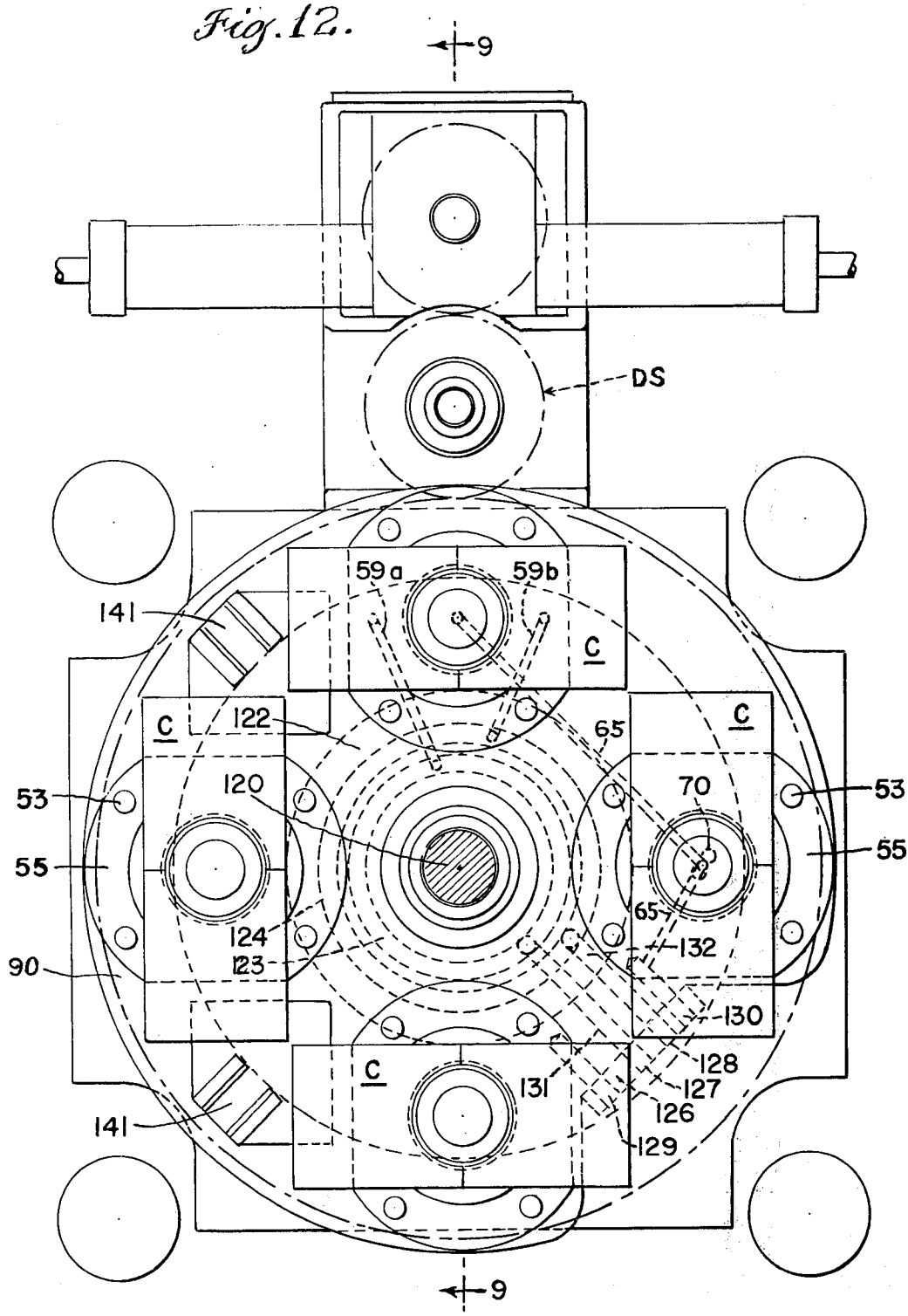
FIG. 12 is an elevational view of the apparatus shown in FIG. 9 taken along line 12—12.

Certain aspects of the invention herein disclosed are concerned with the distribution of fluids to the core assemblies on a rotating core carrying mount from a single point on the periphery of the rotating mount. Referring to FIGS. 9 and 12 a turntable T is mounted for oscillation on movable platen U by means of a central shaft 120. As previously described, the drive system DS causes oscillation of the turntable T and shaft 120. Mounted to the turntable T are core assemblies C of the type heretofore described with reference to FIGS. 5 through 8. A manifold 122 is mounted in a recess on the rear surface of turntable 90. As shown, the manifold 122 can be annular in shape and includes two channels 123 and 124 which, in conjunction with suitable sealing means 125, form fluid-tight passageways.

An input manifold 126 (FIG. 12) is disposed on a peripheral surface of the turntable T. The manifold 126 includes a plurality of fluid couplings to which supply hoses are attached. As illustrated in FIG. 12, the input manifold 126 includes four connections 127, 128, 129, 130.

Cold water or other coolant for cooling the neck rings of the core assemblies C can be supplied through orifice 127 to conduit 131 formed in the turntable 90. Conduit 131 communicates with annular channel 123 and supplies cold water thereto. Conduits, such as conduit 59a are formed in the turntable T, for instance, by deep boring techniques, and convey cold water from annular channel 123 to conduits such as conduit 58 (FIG. 5) in the core assemblies C. As heretofore described the cold water circulates through the core assembly C and is discharged to an outlet conduit 59b which communicates with the annular channel 124. The conduit 132 formed in the turntable T conveys the discharged water from channel 24 to the water outlet 128. Thus, cooling water for the neck rings of four core assemblies is supplied and carried away through only two connections to the turntable.

Similarly, heat exchange fluid can be supplied through connections 130 to conduits 65 which supply the heat transfer medium to the interior of the core assembly C as heretofore described. For simplicity only two conduits 65 have been shown, but it should be realized that a conduit 65 is necessary to connect each successive core. In instances where the number of cores is four or less, a plurality of conduits 65 can serially connect all the cores so that heat transfer medium supplied through orifice 130 can be discharged through connection 129 which communicates with the last core in the series. However, if more than four cores are used, it has been found to be advantageous to use two or more separate circuits for the heat transfer medium. Such additional circuits can be supplied from passages formed in the input manifold 126.

It will be recalled that turntable T is rotated when the platen U is withdrawn from the fixed platen R. after retracting the cores from the injection molds and blow molds on the mounting plate N. To insure proper alignment of the mold cores with the blow molds and injection molds once the turntable is oscillated, means must be employed to insure alignment so that no damage occurs to the mold parts when the platens are once again brought together. In the apparatus disclosed in FIGS. 9 through 12, this is accomplished by the use of a shaft 120 which includes a forwardly projecting extension 142 which, when the platens close, enters the interior space 143 of the post 100. The extension 142 prevents engagement of the core assemblies C with the injection molds 94 and blow molds 95, when the turntable T is not centered with respect to the mounting plate N. Radial alignment of the core assemblies with the blow molds and injection molds is accomplished by the use of a forwardly projecting pin which can be mounted on the mounting plate N. The turntable T will then have mounted thereon locating blocks 141. When the platen U is moved toward the fixed platen R, the pin 140 will engage one of the locating blocks 141 to insure proper radial alignment of the mold cores and molds. If the radial alignment is improper, the tip of the locating pin 140 will engage turntable T or parts of the core assemblies C mounted thereon and a suitable sensing circuit (not shown) will be energized to prevent further movement of the movable platen U.

From the foregoing, it can be seen that an improved injection blow molding apparatus has been provided which provides for a system utilizing to maximum advantage the operating cycle of a standard injection press, which provides only limited face-to-face contact between core assemblies and molds, and which provides core assemblies which are easily mounted on and removed from a supporting surface.

We claim:
1. Blow molding apparatus comprising a preform mold,
a partible blow mold,
a core assembly including a mounting base, a core element, partible neck mold sections surrounding the base of the core element and means mounting the neck mold sections to the mounting base for longitudinal and divergently outward movement with respect to the core element,
means for causing the core element to be alternately axially inserted in and retracted from the preform mold and the blow mold including the retraction of said core element from a finished article while the finished article is still in the blow mold, and
motor means for moving the neck mold sections longitudinally and divergently outward with respect to the core element as the core element is separated from a finished article in the blow mold.

2. Apparatus according to claim 1 wherein the mounting means includes a plurality of angularly disposed pins, and wherein neck mold sections are received on the pins, and the motor means for moving the neck mold sections includes means forming a fluid-tight chamber between a pin and the neck mold section mounted on the pin, means forming a conduit in the pin for supplying fluid under pressure to the chamber, an orifice in the mounting base, and means for supplying fluid under pressure from the orifice to the conduit.

3. Apparatus according to claim 1 wherein the primary direction of travel of the motor means is normal to the longitudinal axis of the core element.

4. Apparatus according to claim 1 wherein the mounting means includes a plurality of angularly disposed pins, and wherein neck mold sections are received on the pins, and the motor means for moving the neck sections includes at least certain of said pins being pistons movable with said neck mold sections, cylinders for said pistons in said mounting base, and means for supplying fluid under pressure to said cylinders to move said pistons and said neck mold sections.

5. Apparatus according to claim 4 wherein said mounting means for each neck mold section also includes a surface angularly disposed with respect to a longitudinal axis of said core assembly, and the respective neck mold section being in retained sliding engagement with said surface.

6. Apparatus according to claim 1 wherein said mounting means for each neck mold section includes a surface angularly disposed with respect to a longitudinal axis of said core assembly, the respective neck mold section being in retained sliding engagement with said surface, and said motor means is mounted in said mounting base.

7. Apparatus according to claim 1 wherein said mounting means for each neck mold section includes a surface angularly disposed with respect to a longitudinal axis of said core assembly, the respective neck mold section being in retained sliding engagement with said surface, and said motor means is mounted in said mounting base and is a fluid motor.

8. Apparatus according to claim 1 wherein said mounting means for each neck mold section includes a surface angularly disposed with respect to a longitudinal axis of said core assembly, the respective neck mold section being in retained sliding engagement with said surface, and said motor means is mounted in said mounting base and has a direction of travel parallel to said surface.

9. Blow molding apparatus comprising a fixed platen,
preform molds and blow molds mounted on said fixed platen,
a movable platen mounted for movement toward and away from the fixed platen along a fixed straight line path,
a turntable mounted on the movable platen for rotation in a plane disposed normal to said fixed path,
a plurality of mold core assemblies on the turntable, the core assemblies including means for circulating a fluid heat exchange medium therein including inlet means and outlet means,
means carried by the turntable for supplying heat exchange fluid to the core assemblies comprising a manifold having two fluid channels therein, one being an inlet channel and the other being an outlet channel,
means for conducting fluid from the inlet channel of the manifold to the inlet means of the cores,
means for conducting fluid from the outlet means of the cores to the outlet channel of the manifold,
means for supplying heat exchange fluid to the inlet channel of the manifold, and
means for carrying heat exchange fluids away from the outlet channel of the manifold.

10. Molding apparatus in accordance with claim 9 wherein the manifold is an annular member having the inlet channel and the outlet channel formed in one surface thereof.

11. Molding apparatus in accordance with claim 10 wherein the means for conducting fluid from the inlet channel to the cores and the means for conducting fluid from the cores to the outlet channel are fluid-tight conduits formed internally in the turntable.

12. Molding apparatus in accordance with claim 9 wherein the means for supplying heat exchange fluid to the inlet channel of the manifold and the means for carrying heat exchange fluid away from the outlet channel of the manifold are conduits formed internally in the turntable, which conduits extend to an outer peripheral edge of the turntable.

13. Molding apparatus in accordance with claim 10 wherein the manifold is concentrically mounted with respect to the axis of rotation of the turntable.

14. Injection blow molding apparatus comprising an annular series of molds and a coaxial annular series of mold cores mounted for relative axial movement toward and away from each other to effect insertion of the cores into and withdrawal of the cores from the molds, some of the molds of said series being blow molds and some being injection molds, the molds and cores further being mounted for relative angular movement about an axis coincident with the axis of the series of molds and cores to provide for insertion of a given core alternatively into an injection mold and into a blow mold, the blow molds being split into blow mold sections, and means mounting the blow mold sections for relative angular opening and closing movement about said axis.

15. Injection blow molding apparatus comprising an annular series of molds and a coaxial annular series of mold cores mounted for relative axial movement toward and away from each other to effect insertion of the cores into and withdrawal of the cores from the molds, some of the molds of said series being blow molds and some being injection molds, said cores being arranged about a common axis disposed coincident with a common axis about which said molds are arranged, the molds and cores further being mounted for relative angular movement about the common axis of the series of molds and cores to provide for insertion of a given core alternatively into an injection mold and into a blow mold, the blow molds being split into blow mold sections, and means mounting the blow mold sections for relative opening and closing movement including an actuating device mounted for pivotal movement about said axis and connected with one of the blow mold sections of each blow mold to provide for relative angular movement of that one of the blow mold sections of each blow mold connected to said actuating device with respect to the other blow mold section of each blow mold.

16. Injection blow molding apparatus as defined in claim 15 and further including another actuating device mounted for angular movement about said axis and connected with the other blow mold section of each blow mold, the two actuating devices being angularly movable with respect to each other about said axis.

17. Injection blow molding apparatus comprising an annular series of molds arranged about a common axis, a turntable mounted for angular movement about said common axis, an annular series of mold cores mounted on the turntable, the turntable and the series of molds being relatively movable toward and away from each other to effect insertion of the cores into and withdrawal of the cores from the molds, some of the molds of said series being blow molds and some being injection molds to provide for insertion of a given core alternatively into an injection mold and into a blow mold, the blow molds being split into blow mold sections in planes containing the axis of the turntable, and means mounting the blow mold sections for angular opening and closing pivotal movement around said common axis.

18. Blow molding apparatus comprising
a fixed platen,
a movable platen,
means mounting the movable platen for movement toward and away from the fixed platen,
a turntable disposed between the fixed and movable platens,
means for rotatably mounting the turntable to enable rotation of the turntable about an axis parallel to the direction of movement of the movable platen,
a plurality of core elements arranged on the turntable with the longitudinal axis of each core element parallel to the axis of rotation of the turntable,
a plurality of blow molds disposed between the fixed and movable platens, each blow mold being comprised of partible mold sections,
a pair of mounting members and means for rotatably mounting the mounting members for rotation about an axis parallel to the direction of movement of the movable platen,
means for securing one mold section of each blow mold to a first one of the mounting members and means for securing the other mold section of each blow mold to the second one of the mounting members, and
means for rotating the mounting members in opposite directions to first and second positions whereby, in the first position of the mounting members, the mold sections about to form closed blow molds, and in the second position, the blow mold sections are parted to allow removal of an article from the blow molds.

19. Blow molding apparatus as in claim 18 wherein axis of rotation of the mounting members is coincident with the axis of rotation of the turntable.

20. Blow molding apparatus comprising a platen, a plurality of blow molds arranged in an annular array on the platen, the blow molds being comprised of first and second mold sections, mounting members mounted on the platen, means mounting the members for rotation about an axis normal to the platen, a plurality of securing means extending from a first one of the mounting members, and plurality of securing means extending from a second of the mounting members, means affixing the plural first sections of the blow molds to the plural securing means of the first mounting member, and means for affixing the plural second sections of the blow molds to the plural securing means of the second mounting member, and means for rotating the first and second members about the mounting means.

* * * * *